Patented July 30, 1940

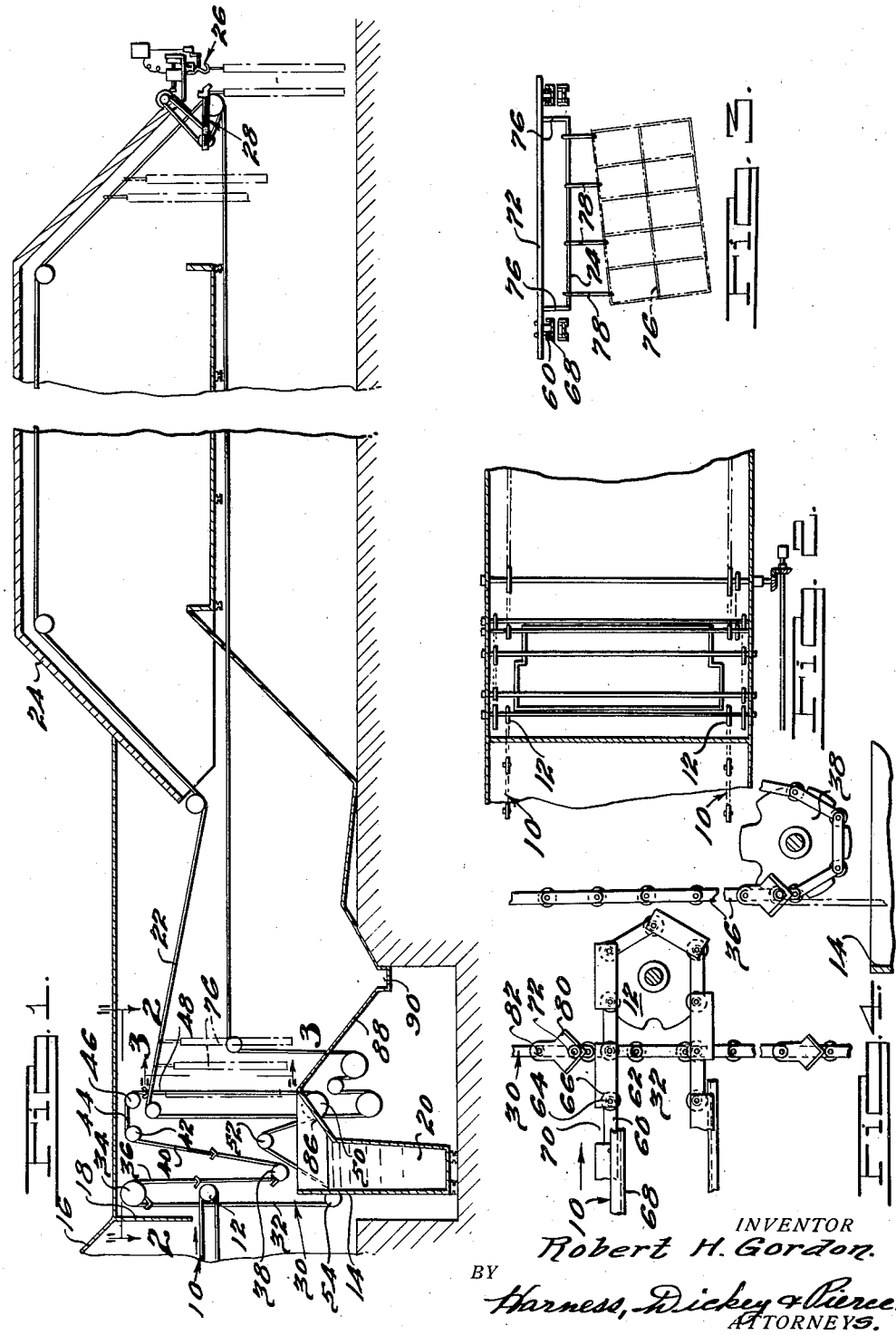

2,209,916

UNITED STATES PATENT OFFICE 2,209,916

CONVEYER MECHANISM

Robert H. Gordon, Detroit, Mich., assignor to Parker Rust-Proof Company, Detroit, Mich., a corporation of Michigan Original application November 15, 1937, Serial No. 174,614, now Patent No. 2,138,095, dated November 29, 1938. Divided and this application July 5, 1938, Serial No. 217,410

1 Claim. (Cl. 214—17)

This invention relates to conveyer mechanisms and particularly to that type thereof including endless chains from which articles to be transferred and/or treated are suspended, and is a division of my application for Letters Patent of the United States filed Nov. 15, 1937 for improvements in Conveyer mechanism, Serial No. 174,614, now Patent No. 2,138,095.

Objects of the invention include the provision of a conveyer mechanism particularly adapted to subject articles carried thereby to a quick dipping operation in a liquid coating or the like; the provision of a conveyer mechanism including relatively slow moving portions and means for removing articles therefrom and subjecting them to a quick dipping operation and returning them thereto; the provision of a conveyer mechanism including a pair of relatively slow moving conveyer chain portions arranged with their ends in adjacent relationship and means including a relatively fast moving transfer chain portion adapted to remove articles from the end of one of the conveyer portions, subject the articles to a dipping operation, and then depositing them upon the end of the other of said conveyer portions; the provision of a construction as above described in which the adjacent ends of the slow moving conveyer portions are arranged at different elevations; and the provision of a conveyer mechanism adapted to carry articles requiring a dipping operation so constructed and arranged as to minimize the overall length of the conveyer mechanism as compared to previously suggested constructions.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a more or less diagrammatic, fragmentary side elevational view of my improved conveying mechanism;

Fig. 2 is a fragmentary plan view taken on the line 2—2 of Fig. 1;

Fig. 3 is a fragmentary sectional view taken on the line 3—3 of Fig. 1 and illustrating a preferred form of article carrier for the conveying mechanism and illustrating an article supported therefrom;

Fig. 4 is an enlarged fragmentary side elevational view illustrating in greater detail the construction of the forward main conveyer chains, the manner in which the transfer chains cooperate with the discharge end of the same, and the manner in which the transfer chains cooperate with the paint tank to immerse articles carried thereby in the paint within the tank.

Referring to the drawing the numeral 10 generally indicates a pair of relatively slow moving main conveyer chains moving in the direction indicated by the associated arrows and the rear or discharge end of which is trained over sprockets 12 which are positioned in approximate vertical alignment with respect to the front edge of a tank 14 positioned therebelow. As fully shown and described in my application Serial No. 174,614 of which the present application is a division, the main conveyer chains 10 are located within the drying hood 16 and extend to the position indicated in Fig. 1 downwardly from the upper portion of the drying hood, and the articles carried thereby are deposited upon the main conveyer chains 10 in such upper portion. Such articles are deposited upon the main conveyer chain 10 after having been subjected, for instance, to a rustproofing operation so that they may be thoroughly dried before being subjected to a dipping operation in a bath of paint, enamel, or the like. The rear end of the hood 16 is provided with a downwardly projecting skirt 18 under which the discharge end of the main conveyer chains 10 project, this being for the purpose of preventing loss of heat from the hood 16 by restricting the circulation of air therethrough.

It will also be understood that after the articles have been dipped in the paint it is also desirable but not necessary to again subject them to a drying operation so as to insure a quick drying of the paint to enable early handling of the article. In the present case this second drying operation is accomplished by the use of a second pair of main conveyer chains 22 which extend from a point above the discharge end of the tank 14 downwardly under the forward end of a second drying hood 24, then upwardly through the drying hood 24 and then downwardly out of the discharge end of the same. Articles carried by the main conveyer chains 22 may be discharged therefrom to a mono-rail conveyer indicated generally at 26 by means of a transfer mechanism indicated generally at 28 of the same general type and construction as disclosed and claimed in my Letters Patent of the United States No. 2,103,901, issued Dec. 28, 1937 on Conveyer mechanism.

Ordinarily, in accordance with conventional practice, the main conveyer chains 10 and 22 would be combined as a single pair of conveyer chains and the dipping of the articles in the tank 14 accomplished either by depressing the main conveyers over an elongated tank, or by a conventional type of transfer chains of the same general type illustrated in my application Serial No. 174,614, of which the present application is a division, for dipping the articles in the rust-proofing solution, and in which articles are simply lifted upwardly from one position on the main conveyer chains, carried over the forward edge of a tank, and then redeposited on the main conveyor chain with the articles in submerged condition in the liquid in the tank, and later removed from the tank in a similar manner. However, in accordance with the present invention such pair of conveyer chains are separated into the main conveyer chains 10 and 22 and the discharge end of the main conveyer chains 10 is operatively connected with the forward or receiving end of the main conveyer chains 22 by means of a pair of transfer chains indicated generally at 30 positioned between such ends. Each of the transfer chains 30 includes an upwardly moving run 32 located on the outside of a corresponding main conveyer chain 10 immediately in advance of the sprocket 12 thereof. The upwardly extending run 32 extends to a sprocket 34 positioned a sufficient distance above the main conveyer chains 10 so as to insure the lower edges of articles carried thereby being lifted upwardly above the upper edge of the tank 14 after passing over the upper sprocket 34. From the sprockets 34, each transfer chain 30 continues as a downwardly moving run 36 to a sprocket 38 positioned immediately over the tank 20 and after passing over the sprocket 38 continues as an upwardly moving run 40 to an upper sprocket 42 positioned at approximately the same horizontal level as the sprocket 34, then extends rearwardly as at 44 in a horizontal plane to a sprocket 46 located over the advanced edge of the main conveyer chains 22, and then continues as a downwardly extending run 48 to a sprocket 50 after which it travels upwardly over a sprocket 52 and then downwardly under a sprocket 54 to connect with the upwardly extending run 32. Thus articles which are picked up by the transfer chains 30 from the discharge end of the main conveyer chains 10 are first lifted upwardly by the runs 32, then moved downwardly by the runs 36 to a point where such articles are immersed in the paint 20 in the tank 14, and then are carried upwardly out of the paint by the runs 40, transferred by the runs 44 over the advance edge of the main conveyer chains 22 and are then carried downwardly and deposited upon the main conveyer chains 22 by the downwardly extending runs 48. It will, of course, be understood that the transfer chains 30 travel at a materially higher speed than either of the main conveyer chains 10 or 22 so that a relatively short length of time elapses from the time the articles are removed from the discharge end of the main conveyer chains 10, dipped in the paint 20 and deposited upon the forward end of the main conveyer chains 22.

While the above arrangement necessitates splitting the main conveyer chains into two sections 10 and 22, respectively, it requires the use of only one set of transfer chains 30, permits a materially shorter tank 14 to be employed than in accordance with conventional practices and, therefore, permits the conveying mechanism to be shortened accordingly and effecting a saving in floor space and the like. Likewise because of the ability to use a shorter tank 14 a smaller body of paint is required than in conventional practices and this effects a saving not only in the amount of paint required to be maintained on hand, but also in the amount of paint lost by oxidization in the tank itself.

It will be appreciated that the conveyer chains 10 and 22 and the transfer chains 30 are all driven in synchronism, the conveyer chains 10 and 22 being driven at a much slower rate of travel than the transfer chains 30 but not necessarily at the same slow rate. The driving of the various conveyer chains and transfer chains is accomplished in a conventional manner as, for instance, the manner indicated in Fig. 2 which indicates driving connections between the sprocket shafts of the conveyer chains 10 and 22 and the transfer chains 30.

While any suitable type of main conveyer chains and transfer chains may be employed in the practice of the present invention, the construction of the conveyer chains 10 illustrated in Fig. 4 are illustrative of a suitable type which may be employed for both the conveyer chains 10 and 22. As illustrated in Fig. 4 the main conveyer chain 10 there shown is composed of alternate narrow links 60 and wide links 62 adjacent ends of which are pivoted together by means of pins 64 with the lower edges of the links 60 and 62 in the upper run in flush or substantially flush relationship. Rollers 66 are carried by the pins 64 and project a slight distance below the lower edges of the cooperating links. The upper runs of the conveyer chains 10 are received in upwardly opening supporting channels 68, the rollers 66 thus affording rolling contact with the bottoms of the channels. The alternate narrow and wide links 60 and 62, respectively, form between each adjacent pair of wide links 62 a notch 70 in which the end portion of an article carrier may be readily received.

While any suitable type of article carrier may be employed it will usually be of a bar type such as illustrated at 72 in Fig. 3. The carrier shown in Fig. 3 is of a preferred type in which the bar 72 is provided with a smaller bar 74 supported therebelow it by means of end connecting members 76 located inwardly of the outer ends of the bars 72 and from which an article such as 76, illustrated in the present case as a window frame, may be supported by means of hooks such as 78. The connectors 76 are spaced from each other axially of the bar 72 so as to be freely receivable between the main conveyer chains 10 and 22 and the lengths of the bars 72 are such as to be slightly shorter than the distance between the opposite chains of the transfer chains 30. At predetermined positions along the length of the transfer chains 30 inwardly projecting buckets 80 are suspended from the pivot pins 82 between the various links of the chain so that when moving upwardly past the end of the main conveyer chains 10 opposed buckets 80 will engage the opposite ends of a bar 72 supported on the main conveyer chains 10 and lift the bar with the article carried thereby upwardly therewith and then carry it through the cycle of operation previously described.

It may be noted that because of the speed of operation of the transfer chains 30 the articles supported thereby and which have been dipped in the paint 20 in the tank 14 will usually continue to drip paint therefrom for some distance beyond the tank 14. For this reason the upper edge of the tank 14 on the discharge side thereof may be flared rearwardly as at 86 to catch such drip and return it to the tank 14, and beyond the portion 86 a flared drip trough 88 may be provided having a central channel 90 into which paint dripping upon the same may be collected and either returned to the tank 20 or otherwise suitably disposed of.

Formal changes may be made in the specific embodiment of the invention described without departing from the spirit or substance of the broad invention, the scope of which is commensurate with the appended claim:

What I claim is:

In a transfer mechanism, in combination, a pair of relatively slow moving conveyer chains having upper and lower runs, a second pair of relatively slow moving conveyer chains in longitudinal alignment with said first pair of conveyer chains and likewise having upper and lower runs, the upper runs of said pairs of chains being adapted to support and transfer articles, each of said pairs of chains having a receiving end and a discharge end, the discharge end of said first pair of conveyer chains terminating in horizontally spaced but relatively close relation with respect to the receiving end of said second pair of conveyer chains, a tank of relatively small longitudinal dimension positioned between and below the spaced ends of said pairs of conveyer chains, a pair of relatively fast moving transfer chains each operatively associated with one of each of said pairs of conveyer chains and operatively connecting the upper runs of the adjacent ends of said pairs of conveyer chains, said transfer chains each having article supporting runs intersecting the planes of each of the upper runs of said spaced chain ends and extending from the discharge end of said first pair of conveyer chains first upwardly to lift said articles therefrom, then downwardly between said chain ends to a point immediately above said tank, then upwardly between said chain ends to a point above the receiving end of said second pair of conveyer chains, and then downwardly to deposit said articles on said second pair of conveyer chains, and means on said transfer chains for receiving an article being supported and transferred by said first pair of conveyer chains, lifting said article upwardly from said conveyer chains over the adjacent upper edge of said tank, carrying said article downwardly into said tank, and then upwardly therefrom over the opposite edge of said tank and depositing it on the receiving end of said second pair of conveyer chains.

ROBERT H. GORDON.